US006404655B1

United States Patent
Welches

(10) Patent No.: US 6,404,655 B1
(45) Date of Patent: Jun. 11, 2002

(54) TRANSFORMERLESS 3 PHASE POWER INVERTER

(75) Inventor: Richard Shaun Welches, Amherst, NH (US)

(73) Assignee: Semikron, Inc., Hudson, NH (US)

( * ) Notice: Subject to any disclaimer, the term of this patent is extended or adjusted under 35 U.S.C. 154(b) by 0 days.

(21) Appl. No.: 09/732,063

(22) Filed: Dec. 7, 2000

Related U.S. Application Data
(60) Provisional application No. 60/169,420, filed on Dec. 7, 1999.

(51) Int. Cl.[7] .......................... H02M 1/12; H02M 7/04; H02H 7/122
(52) U.S. Cl. .................. 363/41; 363/56.02; 363/98; 363/17
(58) Field of Search .................. 363/39, 40, 41, 363/17, 56.02, 98, 132

(56) References Cited

U.S. PATENT DOCUMENTS

| 4,754,219 A | * | 6/1988 | Milkovic | 324/142 |
|---|---|---|---|---|
| 4,823,247 A | | 4/1989 | Tamoto | 363/16 |
| 5,119,283 A | | 6/1992 | Steigerwald et al. | 363/37 |
| 5,627,455 A | | 5/1997 | Jacobs | 323/222 |
| 5,894,214 A | | 4/1999 | Jiang | 323/282 |
| 6,198,257 B1 | * | 3/2001 | Belehradek et al. | 323/222 |

FOREIGN PATENT DOCUMENTS

| GB | 2 289 581 A | 11/1995 | H02M/7/04 |
|---|---|---|---|

\* cited by examiner

*Primary Examiner*—Bao Q. Vu
(74) *Attorney, Agent, or Firm*—Scott J. Asmus; Vernon C. Maine; Maine & Asmus

(57) ABSTRACT

The invention in the simplest form is an improved transformerless 3 phase power inverter topology and control method for power distribution systems. This 3 phase power inverter system provides the necessary output voltage and current waveform regulation, harmonic distortion rejection, very low output impedance, and ultra low DC offset of the output AC power, even when exposed to a high magnitude of the non-linear, single phase, or the unbalanced loading.

21 Claims, 8 Drawing Sheets

TO FIG. 6B

TRANSFORMERLESS 3 PHASE POWER INVERTER

This Appln claims benefit of Prov. No. 60/169,420 filed Dec. 7, 1999.

BACKGROUND OF THE INVENTION

1. Field of the Invention

The present invention relates to power converters and distribution schemes for power distribution. More specifically, the present invention relates to a transformerless output 3 phase power inverter topology and control method to facilitate AC power with very low DC offset content, high quality source, and low output total harmonic distortion (THD).

2. Background Art

Electric power distribution is a necessary component of systems that operate with electronic power or in the distribution of electronic power. For example, most electronic equipment is connected to a utility grid wherein power arrives in one form and is transferred and transformed into a form more suitable for the equipment.

The distribution of electric power from utility companies to households and businesses utilizes a network of utility lines connected to each residence and business. The network or grid is interconnected with various generating stations and substations that supply power to the various loads and that monitor the lines for problems. Distributed electric power generation, for example, converting power from photovoltaic devices, micro-turbines, or fuel cells at customer sites, can function in conjunction with the grid. Loads that are connected to the grid take the generated power and convert it to a usable form or for supplementing the grid.

An electric utility grid generally can also consist of many independent energy sources energizing the grid and providing power to the loads on the grid. This distributed power generation is becoming more common throughout the world as alternative energy sources are being used for the generation of electric power. In the United States, the deregulation of electric companies has spurred the development of independent energy sources co-existing with the electric utility. Rather than have completely independent energy sources for a particular load, these alternative energy sources can tie into the grid and are used to supplement the capacity of the electric utility.

The number and types of independent energy sources is growing rapidly, and can include photovoltaic devices, wind, hydro, fuel cells, storage systems such as battery, super-conducting, flywheel and capacitor types, and mechanical means including conventional and variable speed diesel engines, Stirling engines, gas turbines, and micro-turbines. In many cases these energy sources can sell the utility company excess power from their source that is utilized on their grid.

Each of these independent energy sources needs some type of power converter that feeds energy to the grid or used to directly power the various loads. There must also be some means to provide protection when the grid becomes unstable. In most scenarios the utility company is still the main power source and in many cases controls the independent source to some extent.

A problem with the prior art system is that the distribution system is subject to non-linear, high harmonic content and unbalanced loading. This is especially true where the distributed generation system operates independent of the utility grid, and must therefore provide all of the load required harmonic currents. In distributed power applications, high harmonic content or unbalanced loads may lead to utility grid instability, resonances or other unanticipated distribution system behavior that may cause catastrophic failure of the distribution system components. Such a failure can result in damage to equipment and possibly personal injury.

Power converters such as inverters are necessary in modern power systems for the new energy generating devices such as photovoltaic devices, micro-turbines, fuel cells, superconducting storage, etc., that generate AC or DC electricity that needs to be converted to a conditioned AC for feeding into the power grid or for direct connection to loads.

Grid independent DC-AC inverters generally behave as sinusoidal voltage sources that provide power directly to the loads. This type of power distribution architecture is generally required to provide power to both 3 phase and single phase, or line to neutral connected loads. Typically, 3 phase power inverters meet this 3 phase+neutral requirement by isolating the power inverter from the loads with a delta-wye power transformer.

Grid connected DC-AC inverters generally behave as a current source that injects a controlled AC sinewave current into the utility line. The controlled AC current is generated in sync with the observed utility zero crossings, and may be exactly in phase, generating at unity power factor where upon real power only is exported. It is also possible to generate a variable amount out of phase—at other than unity power factor where upon real and reactive power is exported to the grid. An effective change in reactive power output can be made by either phase shifting the output current waveform with respect to voltage or by creating an assymetric distortion to the output current waveform.

Whether grid connected or grid independent, typical delta-wye transformer isolated 3 phase power inverters demonstrate poor output waveform THD when connected to non-linear loads. This is particularly true in the case of even order harmonic currents ($2^{nd}$, $4^{th}$, $6^{th}$, $8^{th}$ etc.). Specifically, typical power transformers common to most power distribution systems demonstrate a tendency to saturate when exposed to even order or DC content load generated non-linear currents. This causes the transformer's impedance to instantaneously decrease, thereby allowing excessive asymmetric currents to flow through the transformer's windings, while decreasing the power actually coupled from primary to secondary. A variety of factors define how steep this saturation transition will occur, including magnetic core material and construction, magnitude of even order harmonics, and transformer operating temperature. At the least, very poor output power quality, nuisance circuit breaker tripping, increased distribution system components losses and increased operating temperatures will be observed.

Although distribution system transformer saturation is not as likely to occur in utility grid connected systems (due primarily to the utility grid's typically lower impedance than the grid connected inverter system), distortion and instability may still occur. This problem is greatly aggravated where power inverters act as "stand alone" voltage sources, where the inverter comprises the only power source to the local distribution system.

These problems are currently solved in the distribution system by over sizing the distribution transformers. For power inverters, expensive gapped core type isolation transformers are commonly employed to decrease the power conditioning system susceptibility to even order harmonic currents, as well as isolate inverter generated DC voltage offsets from the distribution system. The increased cost and space requirements for the isolation transformers are problems that are well known in the industry.

Inverters that perform DC-AC conversion function, and are connected to the grid, are known as "Utility-Interactive Inverters" and are the subject of several US and international codes and standards, e.g., the National Electrical Code, Article 690—Photovoltaic Systems, UL 1741, Standard for Photovoltaic Inverters, IEEE 929—Recommended Practice for Utility Interface of Photovoltaic (PV) Systems.

Pulse width modulator (PWM) inverters are used in three phase bridges, H-bridges, and half-bridge configurations. The bus capacitors, typically electrolytic, consist of two or more capacitors connected in series that are fed from a rectifier or actively switched front end section.

In order to reduce the aforementioned problems, attempts have been made to produce an improved dispensing system. The prior art systems have general short-comings and do not adequately address the aforementioned problems.

What is needed is a means of efficiently operating power inverters, especially for non-linear, high harmonic content, and/or unbalanced loads. This design must also be cost effective to manufacture and implement, and allow for easy incorporation into current designs.

SUMMARY OF THE INVENTION

The present invention has been made in consideration of the aforementioned background. It is therefore an object of the present invention to provide a 3 phase power inverter topology and control method to facilitate very low DC offset voltage, high quality, low output THD operation of three phase power inverters. Particularly when applied to non-linear, high harmonic content, and/or unbalanced loads, common in modem power distribution systems, both commercial and industrial. The topology of the present invention eliminates the requirement of an external isolation transformer, and, yields a considerable cost savings and reduction in space requirements and overall weight. An isolation transformer is normally required for typical three phase inverters when applied to "distributed power" or "power generation" applications that require the power source to provide unbalanced, harmonically rich phase currents with very low output voltage THD. Although isolated gate bipolar transistor (IGBT) power switches are the preferred embodiment in 480V inverter applications, other power switches used in the lower voltage applications (FET's for example) are within the scope of the invention.

Another object of the invention is to provide 3 phase output power at a very low output impedance. This allows for superior output waveform quality (lower voltage THD) than is possible with a typical transformer isolated power inverter. Excessive voltage distortion in inverter based power systems is caused by several factors, including single phase or unbalanced loading of three phase 4 wire power inverter systems, especially when the neutral is connected to the center point between two series capacitors. Another typical cause is non-linear, high harmonic current content loads on three phase systems, particularly those that contain a high magnitude of even order, triplen or DC harmonic current components.

The present invention applies not only to DC-AC inverters, but also to many other methods of electric power conversion, such as static inverters, and rotary converters (DC-AC motor-generator sets that convert DC electricity to AC electricity), cycloconverters and AC to AC motor generator sets (convert AC electricity to AC electricity), and mechanical generators that convert mechanical energy to AC electrical energy.

The control printed circuit board (PCB) of the present invention acts as a digital signal processor (DSP) based digital PWM AC voltage and/or current regulator, with independent phase voltage and current control loops. Independent voltage loops control the line to neutral voltage of each phase output. In one embodiment voltage feedback is provided by three individual resistance isolated differential operational amplifier circuits that incorporate very large integrator capacitors to boost DC gain and thereby enhance DC offset voltage rejection. Independent current loops control the output phase currents. Current feedback is provided by isolated hall sensors and precision operational amplifier circuits.

Both the voltage and the current loops have digitally selected proportional and integral terms, and the feedback circuits have analog phase lead and filter circuits for optimum system tuning. Thus, precise closed loop transient performance is accomplished When connected to the utility grid, use of large capacitor integrators in inverter voltage feedback circuits will tend to cause a gradual phase shift of the voltage feedback circuit based PLL's (phase locked loops) that are commonly used by inverter controls to establish correct synchronization to the utility grid phase angle. This causes output power factor to vary, and will eventually lead to a loss of synchronization. To solve this problem, the DSP closes bi-directional switches across these large integrator capacitors when the inverter is utility grid connected. Further, these switches are used to discharge the integrator capacitors after a system fault and prior to stand-alone voltage mode startup. This prevents a variety of "integrator wind up" problems from occurring.

As described herein, grid independent DC-AC inverters behave as sinusoidal voltage sources and provide power directly to the loads. These prior art power distribution schemes generally require providing power to both 3 phase and single phase or line to neutral connected loads. The 3 phase power inverters for DC-AC accomplish this 3 phase+ neutral requirement by isolating the power inverter from the loads with a delta-wye power transformer. For 3 phase inverters equipped with a balanced dual boost regulator and the transformerless output 3 phase power inverter topology and control described herein, this costly transformer is unnecessary. The dual boost regulator is further described in the U.S. Patent Application entitled Split-Fed and Balanced Dual Boost Regulator filed Dec. 7, 2000. The transformerless 3 phase+neutral inverter power output can therefore achieve lower overall output impedance than an isolation transformer equipped inverter. Thus, lower output voltage distortion is achieved, particularly when the inverter is connected to non-linear loads.

Three phase power inverter systems are commonly exposed to a mixture of linear, non-linear (harmonic), and transformer loads. Transformers are particularly sensitive to DC content of the AC fundamental output voltage. The balanced dual boost regulator, as well as the high frequency center tapped transformer (diode rectified) topologies, forces the output inverter DC bus capacitor voltages to remain balanced thereby dramatically reducing the DC offset of the neutral point (between the upper and lower output capacitors). When combined with the 3 phase inverter transformerless topology and control method, a three phase power inverter maintains high quality output waveforms suitable for transformer loads, even when exposed excessive non-linear loads. Another benefit of the balanced dual boost regulator is that the three phase inverter control algorithms and feedback circuits can be greatly simplified due to the very good stability of the DC bus voltage.

The 3 phase power inverter topology and control method described herein eliminates the need for expensive and oversized isolation transformers both in the inverter power system, as well as throughout the local power distribution system. This reduces power distribution and inverter power conditioning or generating system costs, while simultaneously enhancing overall tolerance of even order and or DC currents.

Since AC distribution system backup requires the use of 3 phase inverters to temporarily feed power into the distribution system, the 3 phase power inverter topology and control method will automatically provide a low output impedance, very low DC offset content (<20 m VDC), AC output waveforms. Such systems are suitable for use with flywheel power inverters.

A further object of the invention is to provide 3 phase 4 wire output power that is more efficient and at substantially lower cost than other transformerless power inverters. This is especially true when compared to a switched neutral type approach that uses a fourth ½ bridge or neutral phase connected to the DC link of a typical 3 phase power inverter and is PWM controlled to hold the neutral phase output a zero volts DC potential. Thus a switched neutral allows for neutral return currents to the appropriate side of the DC link.

The main disadvantage with the switched neutral strategy is that the entire DC link voltage is applied across the neutral phase output LC, or PWM ripple filter. This is distinct from the 3 phase inverter transformerless topology and control method described herein, in that no output LC PWM ripple filter is required in the dual boost equipped 3 phase transformerless topology. Further, the voltage switching ripple applied across an output filter inductor creates core losses proportional to the voltage applied across said filter. That is, the difference between the switched DC voltage and the output voltage, it can be seen that the neutral PWM filter will incur greater core losses than even the individual output phase PWM filters. In addition, in a typical 3 phase, 4 wire output power inverter with balanced phase loads, the neutral current ($I_{Neutral}$) is greater than any one of the phase currents ($I_{phase\ out}$). This further decreases the inverter efficiency by increasing the IGBT and PWM filter losses. These problems are averted in the dual boost equipped, 3 phase power inverter topology and control method described herein.

$$I_{Neutral} = \sqrt{3} * I_{phase\ out}$$

And yet an even further object of the invention is a very efficient, low cost, single or polyphase transformerless power inverter and distribution system for use in automotive, or other very cost sensitive applications. With the expected revolution in automotive design induced by the introduction of fuel cell based technologies, use of the balanced dual boost topology may be indicated. The possible balanced dual boost applications become numerous when applied to various "hybrid" battery/fuel cell/flywheel based main power sources as well as various auxiliaries (pumps, heaters, small motor drives, etc.)

One object of the invention is a transformerless power inverter system for generating a balanced, regulated AC output, comprising a DC-DC converter for regulating a DC source, an inverter section for generating the regulated AC output from the DC source, a control section connected to the inverter section for pulse width modulating the inverter, wherein the control section has a voltage loop and a current loop for each phase of the AC output, and wherein the control section has a means of processing.

Another object is a transformerless power inverter system, further comprising a rectifier section connected to a three-phase 4 wire source for generating the DC source.

Additionally, an object includes a transformerless power inverter system wherein the regulated AC source is single phase. Also, a transformerless power inverter system, wherein the regulated AC source is three-phase.

Additionally, an object is a transformerless power inverter system, further comprising a digital signal processor in the control section.

A further object is a transformerless power inverter system, further comprising a three-phase filter connected to the regulated AC source.

And yet another object is a transformerless power inverter system, wherein the DC-DC converter is a dual boost regulator.

Another object is a transformerless power inverter system, further comprising an integrator bypass switch in the control section for discharging a plurality of integrators.

An object of the invention is a transformerless power inverter system for generating a balanced, regulated AC output, comprising an AC power source, a rectifier section for converting the AC source to a DC source, a DC-DC converter for regulating the DC source, an inverter section for generating the regulated AC output from the DC source, a control section connected to the inverter section for pulse width modulating the inverter, wherein the control section is a voltage loop and a current loop with a means of processing.

Yet another object is a transformerless power inverter system, wherein the DC-DC converter is a center tapped HF transformer.

An object of the invention includes a method for generating a regulated AC output from an inverter, comprising the steps of calculating a voltage feedback for each phase of the regulated output, calculating a current feedback for each phase of the regulated output, comparing a voltage command to the voltage feedback to produce a voltage error, multiplying the voltage error by a voltage proportional and integral term to produce a proportioned voltage signal, comparing the proportioned voltage signal to the current feedback to calculate a current error, multiplying a current error by a current proportional and integral term to produce a proportioned current signal, and calculating a pulse width modulated signal for the inverter.

A final object of the invention is a method for generating a regulated AC output, further comprising a step of closing a bypass switch to discharge a plurality of integrators.

Other objects, features and advantages are apparent from description in conjunction with the accompanying drawings.

DESCRIPTION OF THE PREFERRED EMBODIMENT

Figure 1:
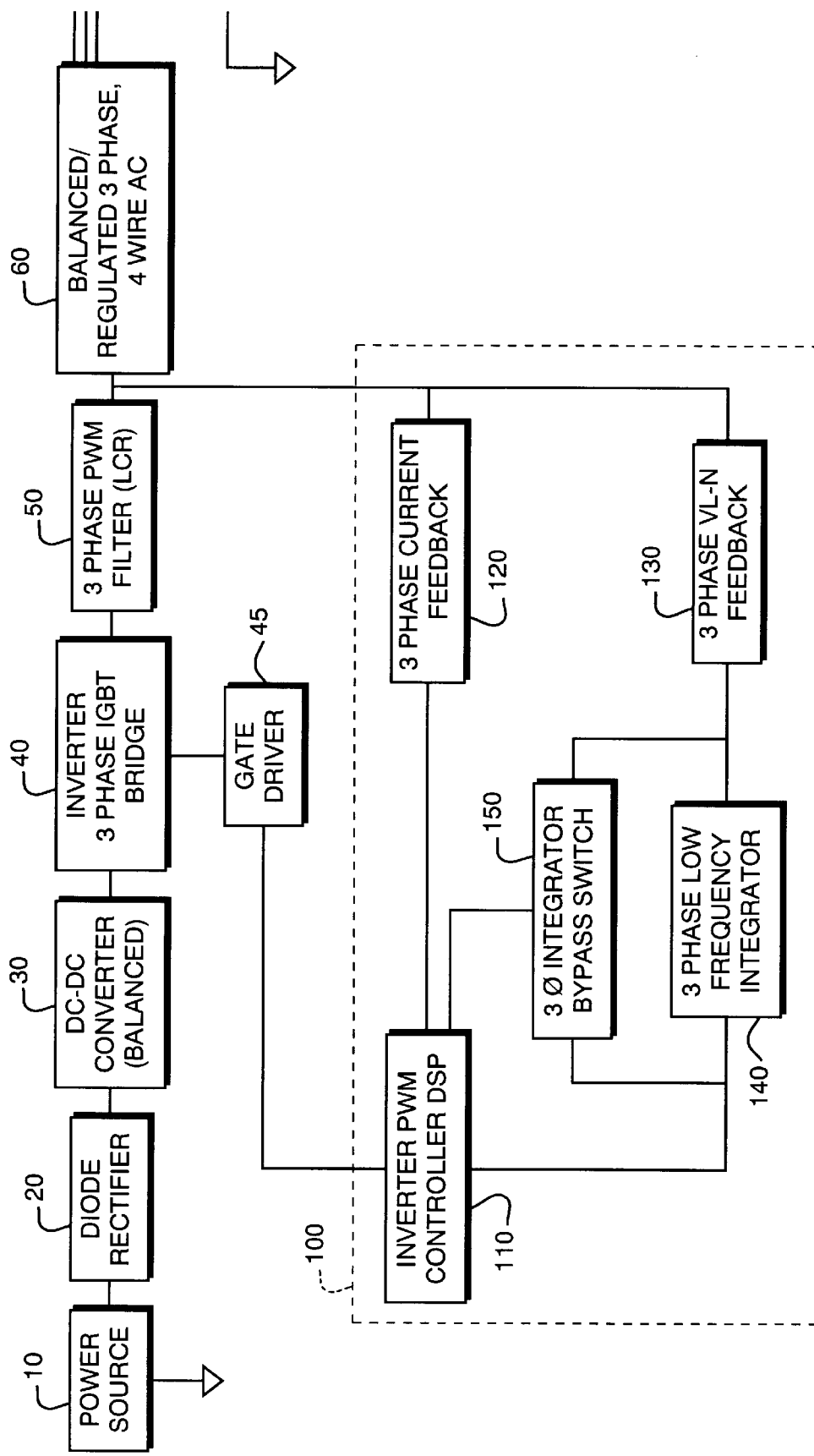
FIG. 1: Block diagram of the basic three phase transformerless inverter power and control loop topology, illustrating functional blocks.

FIG. 1 is a block diagrammatic overview of one embodiment of the transformerless three phase power inverter topology and control method, for use in AC distributed power systems, typically in pulse width modulated (PWM) inverter power generation and/or conditioning applications. The three phase transformerless power inverter topology and control method is illustrated as a system showing a power source 10, such as a three-phase wye configured AC source that connects to the DC-DC converter 30 via rectifier section 20. It is also within the scope of the invention to use a DC power source that is connected directly to the DC-DC converter 30 without using a rectifier circuit. The DC-DC converter 30 is used fir boosting, regulating, and balancing the DC power that is then connected to the 3 phase PWM inverter bridge 40. The three phase IGBT bridge 40 is controlled by the PWM inverter controller 100 using switching signals from the inverter DSP (or microcontroller) 100, via the isolated gate driver circuits 45. The 3 phase inverter output 40 is filtered 50, and is then available as a balanced, regulated 3 phase, 4 wire AC power output 60.

Current feedback 120 as well as voltage feedback 130 is taken from the PWM filter output 50. The three phase current feedback 120 is connected directly to the inverter DSP 110 for A to D conversion. The three phase voltage feedback signals 130 are connected to the DSP 110 via operational amplifier signal conditioning circuits 140 with large, low frequency integrating capacitors. Due to the long integrator time constants, the DSP 110 controls the 3 phase bi-directional switches 150 that are used to quickly discharge the integrators 140 prior to system initialization or reset. Further, the integrators 150 are normally used when the output inverter is operated as a closed loop voltage source, and are held disabled when the output inverter is operated in a utility grid connected, or phase locked loop (PLL) current source. This is due to the excessive voltage feedback phase, and or zero crossing detects errors, common to feedback circuits with large integrators.

Figure 2:
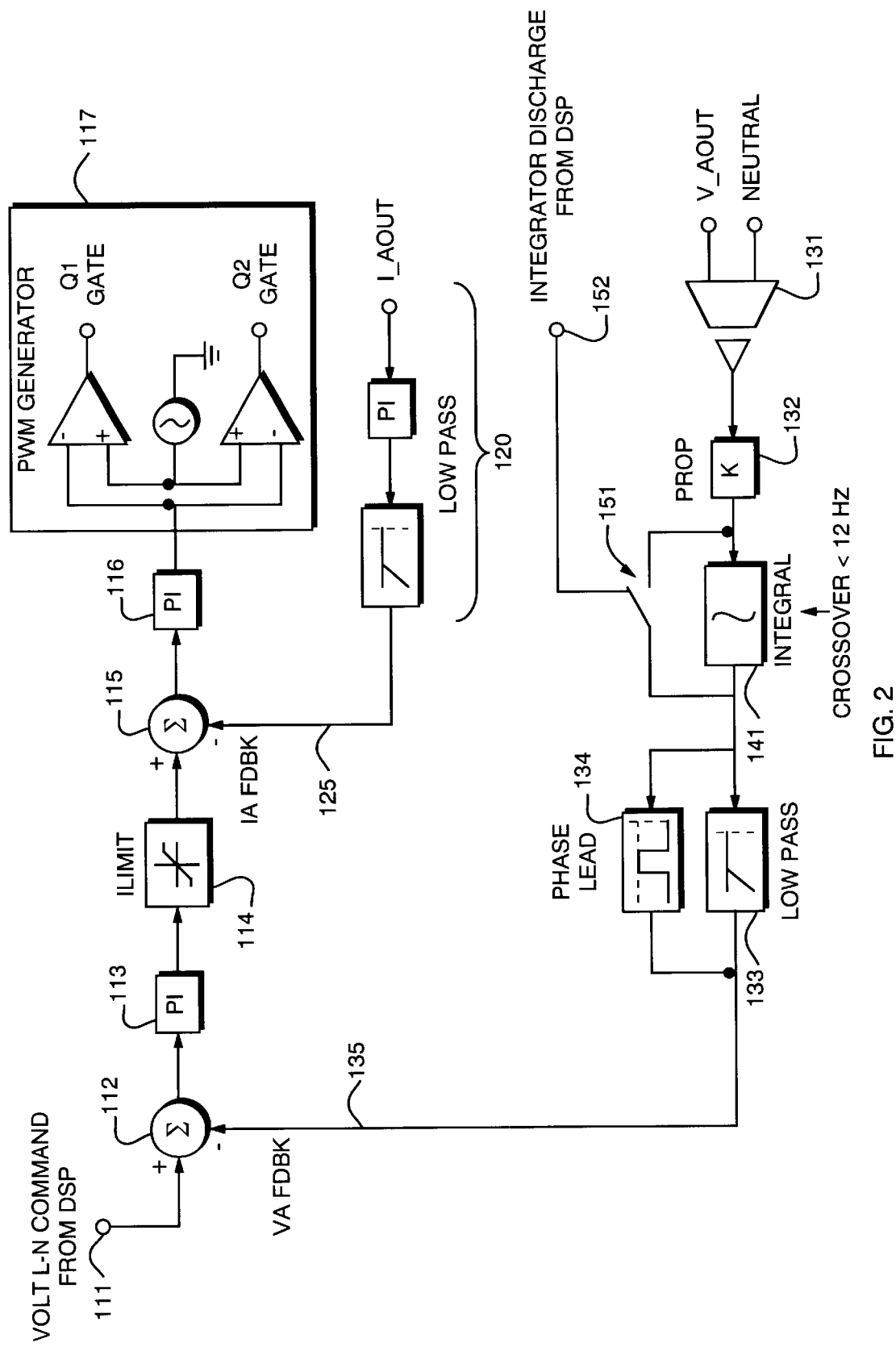
FIG. 2: Three phase transformerless power inverter topology, dual boost front end equipped (for use in microturbine generators)
Figure 3:
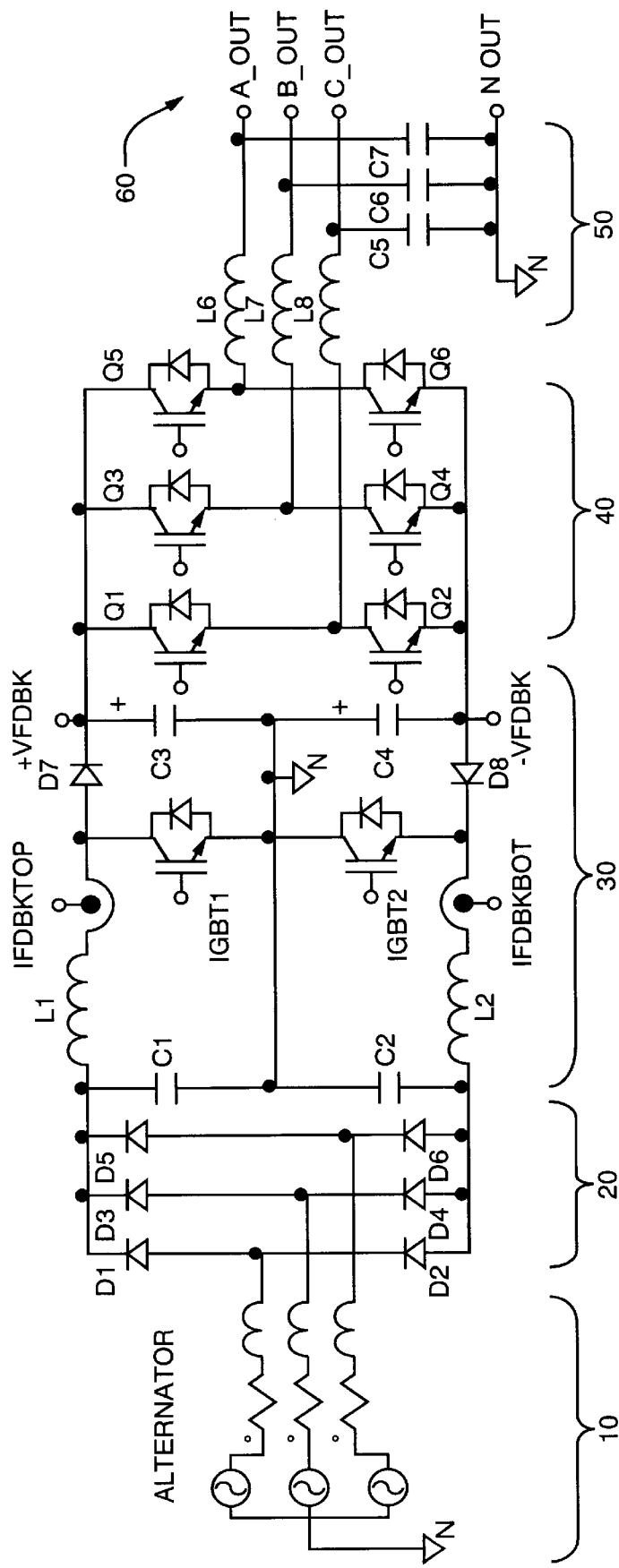
FIG. 3: Center tapped transformer (diode rectified) front end equipped 3 phase transformerless power inverter topology (for use in commercial or industrial fuel cell power systems)
Figure 4:
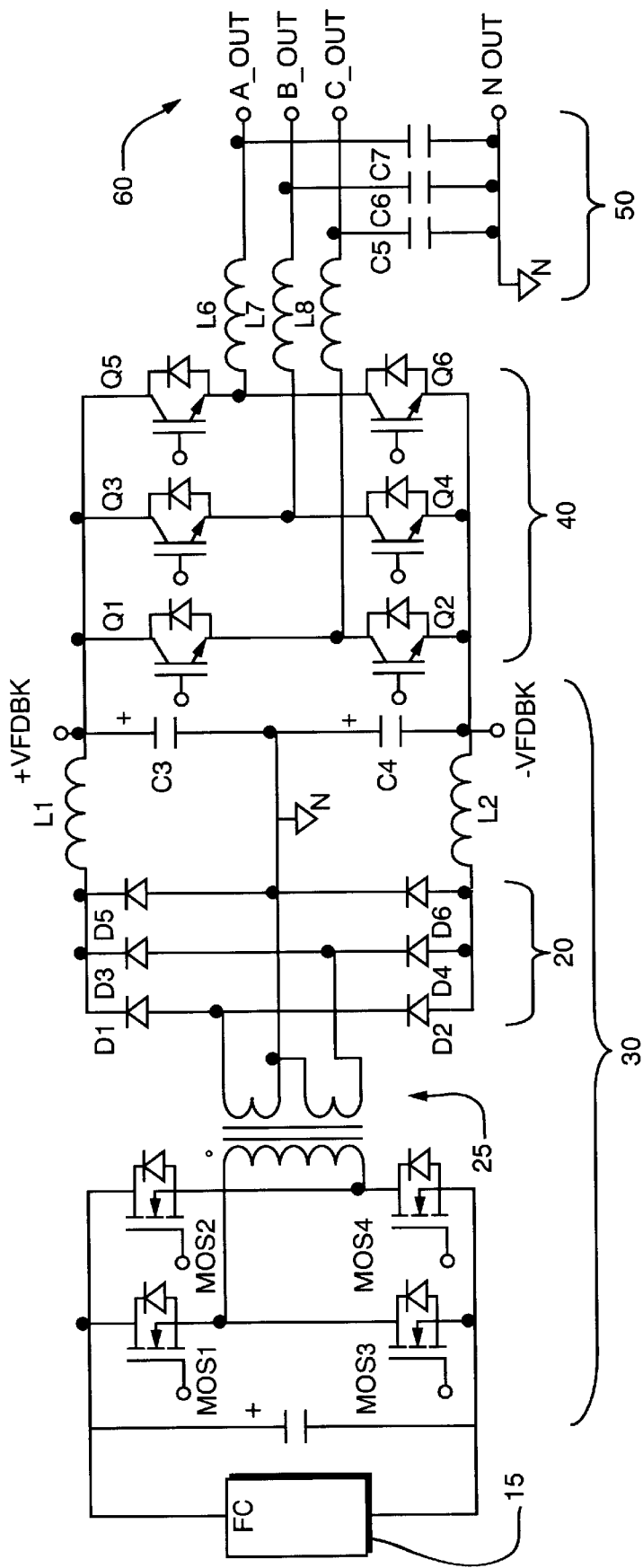
FIG. 4: Center tapped transformer (diode rectified) front end equipped single Phase transformerless power inverter topology (for use in residential fuel cell power systems)
Figure 5:
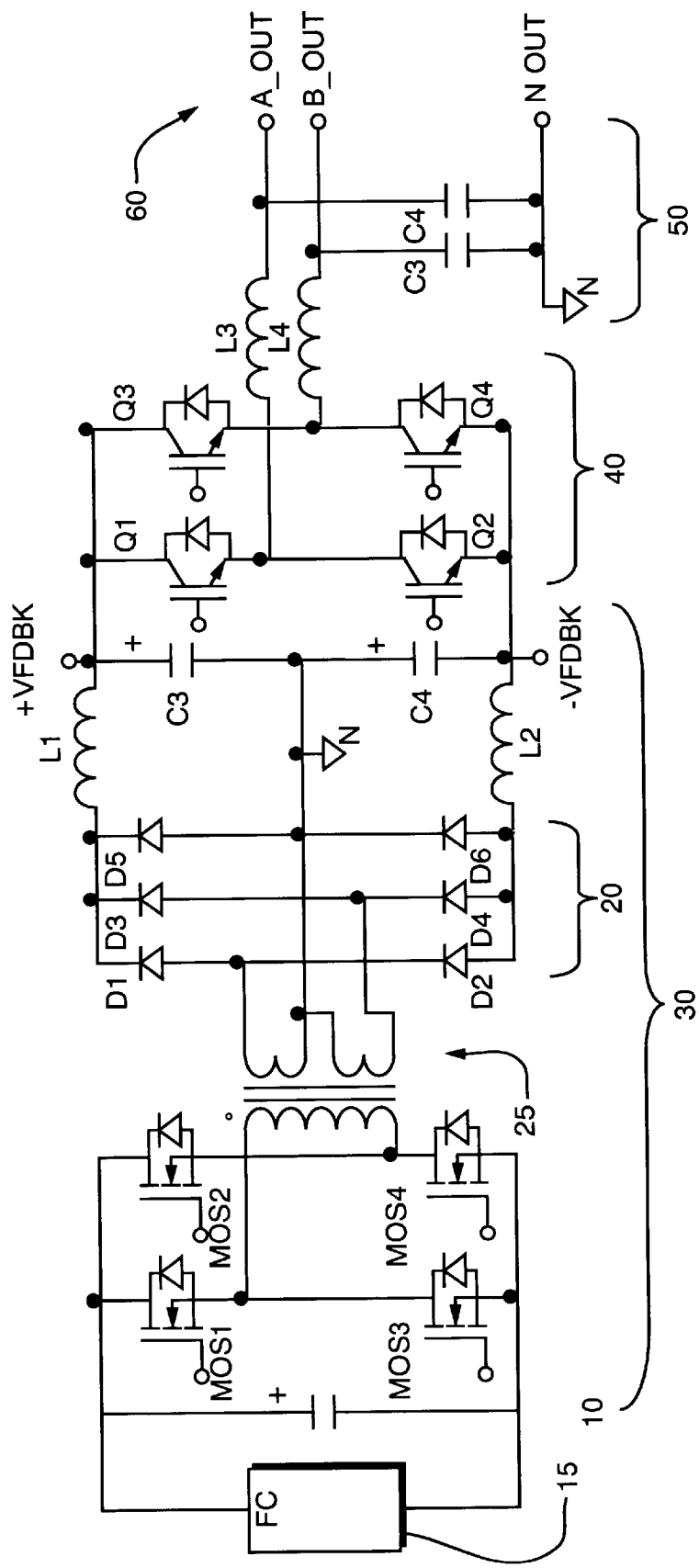
FIG. 5: 3 phase transformerless power inverter control loop diagram
Figure 6A:
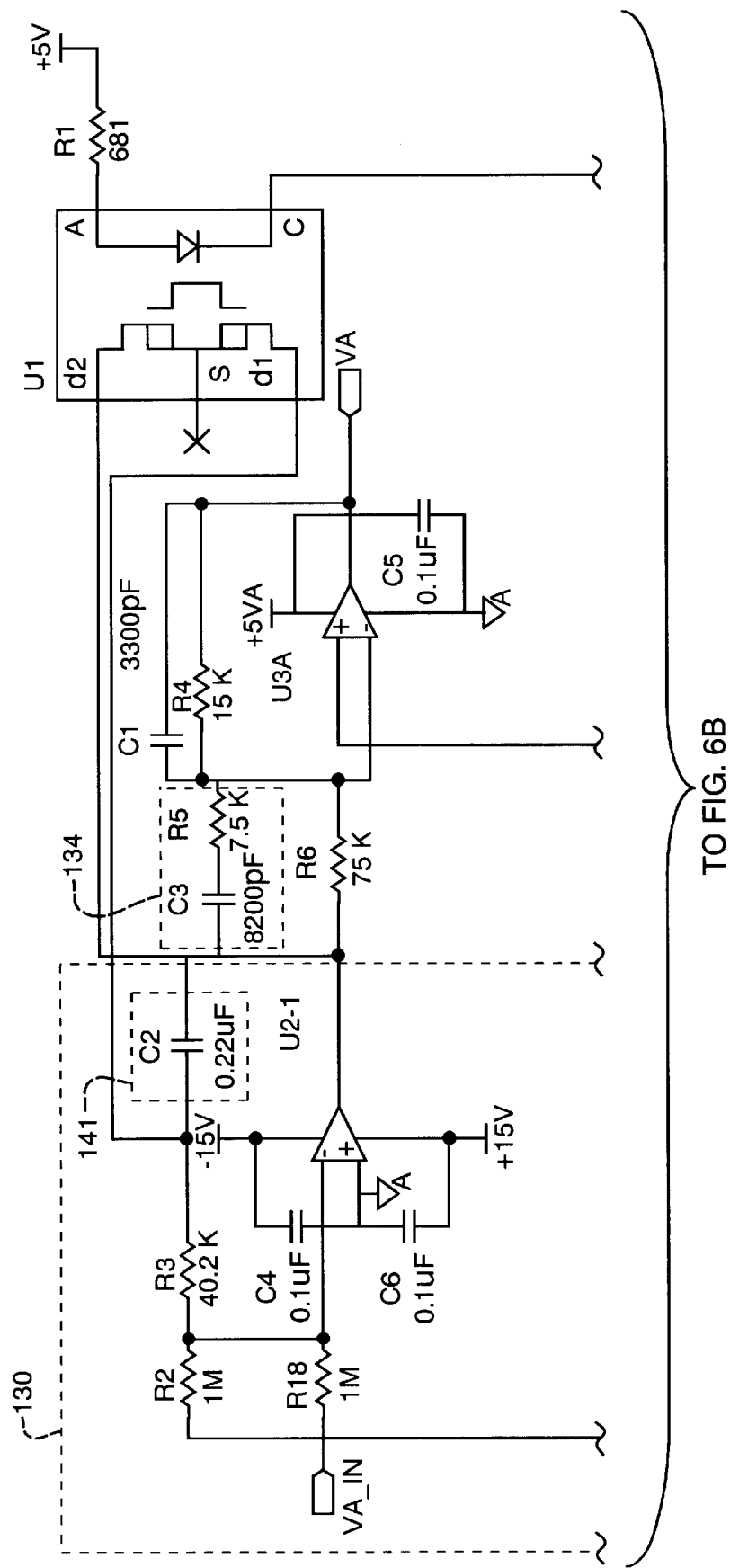
FIGS. 6A, 6B and 6C: 3 phase transformerless power inverter feedback circuits schematic
Figure 6B:
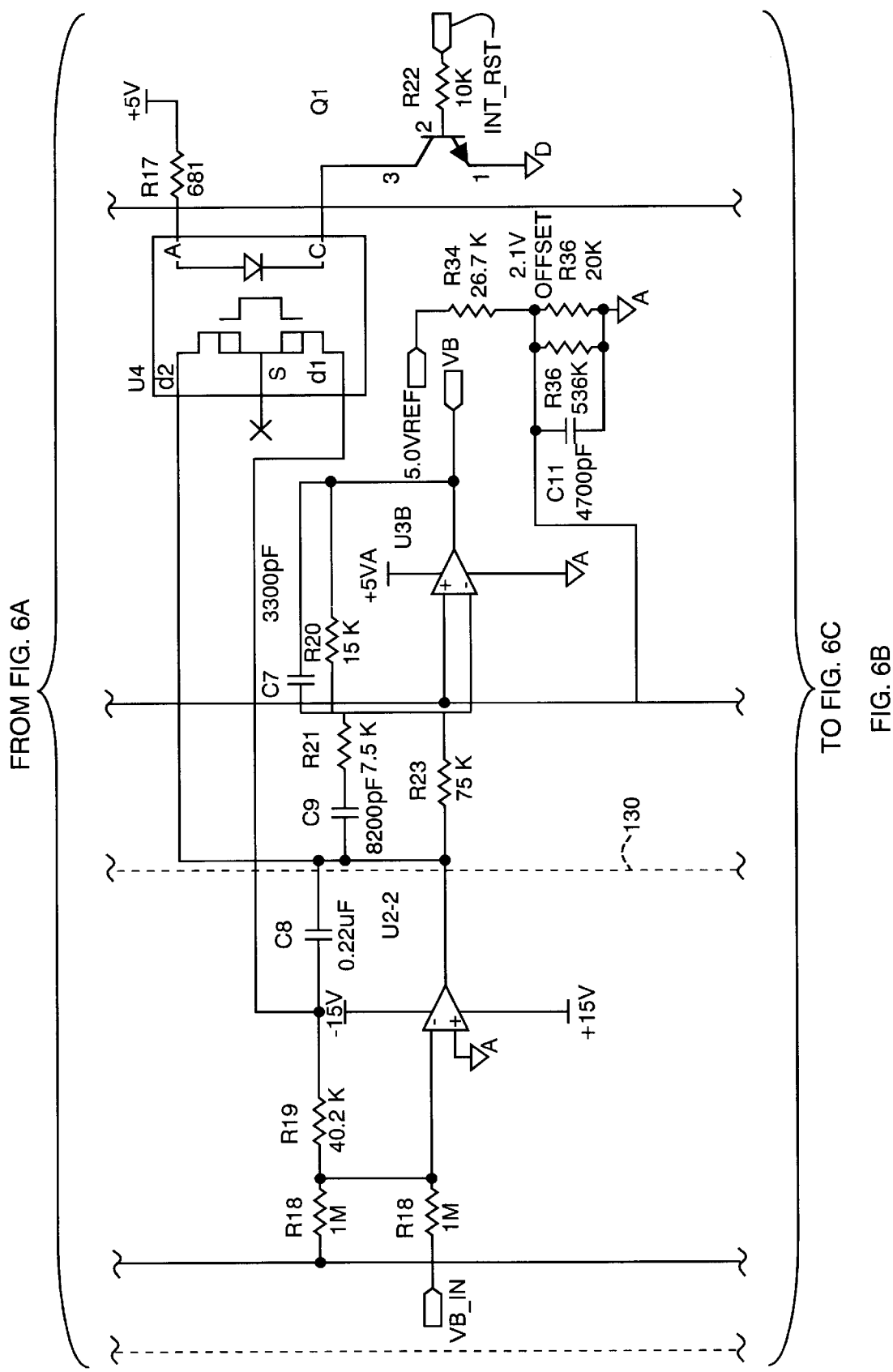
Figure 6C:
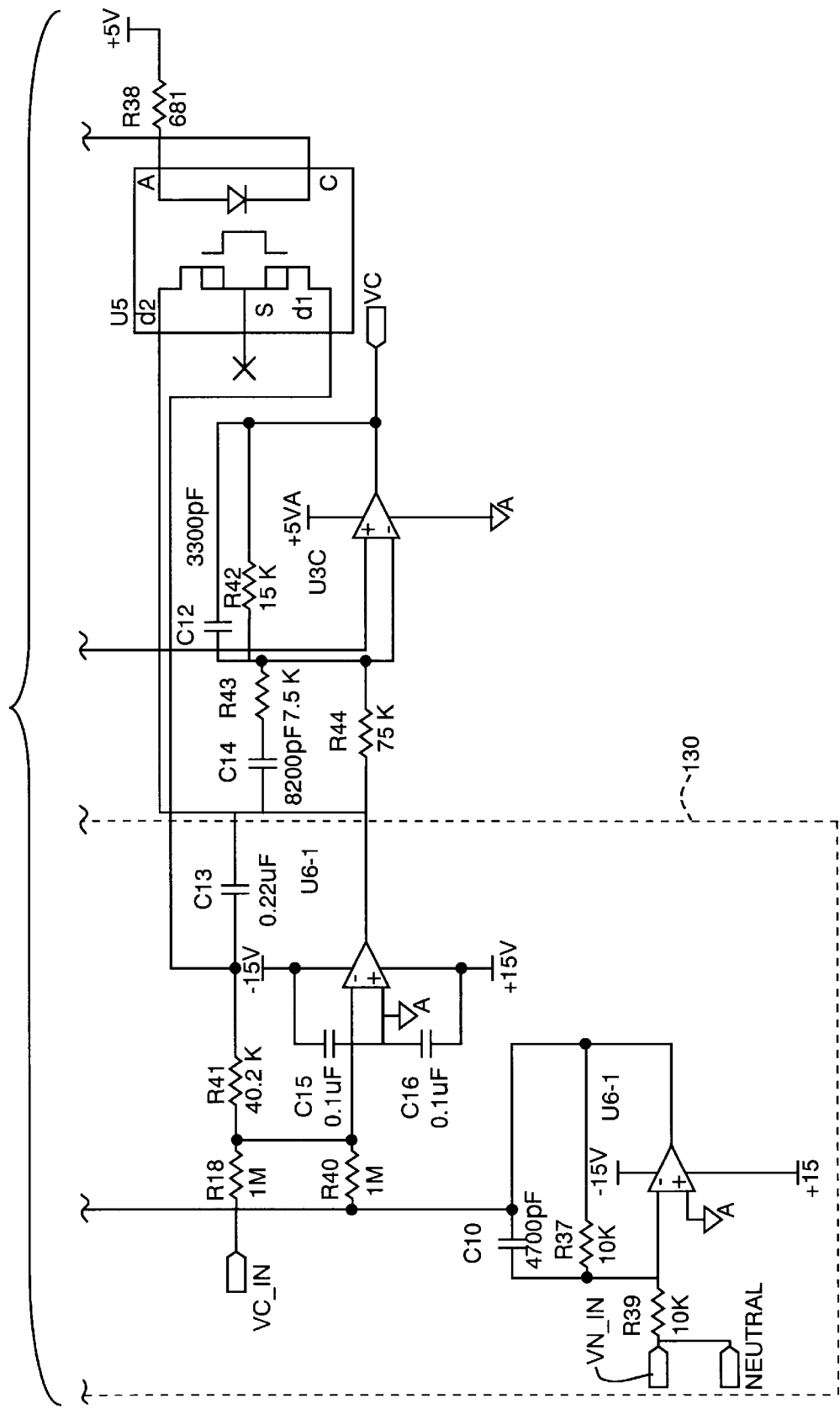

In brief, a control loop diagram of the transformerless 3 phase power inverter control method is shown in FIG. 2. A transformerless three phase power inverter equipped with a dual boost type DC-DC converter section is illustrated in FIG. 3, while FIG. 4 illustrates a transformerless three phase power inverter equipped with a center tapped HF transformer type DC-DC converter. FIG. 5 illustrates the transformerless power inverter topology and control method with a 120/240VAC single phase output inverter for US residential power system applications (specifically 2 PWM phases of 120VAC, 180 degrees out of phase). FIGS. 6A, 6B and 6C are schematic drawings of one embodiment illustrating the inverter topology for the three phases.

FIG. 3 illustrates a dual boost regulator system consisting of AC power source 10 such as an alternator that is connected to a rectifier section 20. The rectifier diodes D1–D6 rectify the AC source to DC. The upper and lower DC link capacitors C1, C2 in the charging paths are independent via the neutral back to the AC source. Although not necessary, these capacitors aid in reducing alternator ripple. The DC-DC converter 30 consists of inductors L1, L2, transistors Q7, Q8, diodes D7, D8 output capacitors C3, C4 as well as control circuits (not depicted). The output of the DC-DC converter 30 goes through an inverter section 40 and a filter section 50 and is output as a 3 phase 4 wire topology 60.

FIGS. 4 and 5 illustrate an H-bridge fed, center tapped HF transformer type DC-DC converter 30. The DC power source 15 could be a fuel cell, a battery or DC generator. The DC source 15 connects to an H-bridge MOS1-4, HF transformer 25, and rectifier section 20 with HF rectifier diodes D1–D6. The DC link inductors L1, L2, and output capacitors C3, C4 as well as control circuits (not shown) comprise the rest of the DC-DC converter section 30. The upper and lower DC link capacitor charging paths are independent via the neutral back to the HF transformer center tap. The output three-phase transformerless inverter 40 consists of Q1–Q6, and the PWM ripple filter 50 consists of L6–L8, and C5–C7.

The control scheme is shown in FIG. 2, wherein a brief summary is followed by a more detailed explanation. The PWM inverter controller consists of three separate phase output controllers, each controller consists of an inner current loop, and an outer voltage loop. A digital voltage command is transmitted to the voltage loop, where it is compared to the conditioned A-D converted voltage feedback term. A voltage error value is calculated and multiplied by a voltage proportional and integral terms. The resulting value is then compared to the current limit term, clamped, and passed to the input of the current loop where it acts as the current command. The current command is compared to the A-D converted current feedback term and a current error is derived. The current error is multiplied by a current proportional and integral term and sent to the PWM calculation stage. The PWM calculation takes the amplified current error signal and compares it to an internally generated triangle reference. Based on this comparison a PWM switching signal is calculated and is sent to the gate drivers of the inverter switches.

The 3 phase analog voltage feedback signals are scaled 132 and filtered by differential amplifiers 131, that takes the difference between the output phase voltages and Neutral (60, FIG. 1) to produce voltage difference signals. The voltage feedback signals are then passed to precision operational amplifiers with low frequency integrators 141. An integrator crossover frequency of 9.5 to 12 Hz is used such that a large DC signal gain can be developed, without causing excessive disturbance to the optimum fundamental frequency (50/60 Hz) gains. The integrators are equipped with DSP controlled 152, bi-directional MOSFET switches 141 which, serve to rapidly discharge the integrators prior to inverter output initialization or inverter utility grid synchronized PLL based current source operation. This is done to prevent PWM output vs utility grid phase error due to integrator caused, inaccurate zero crossing detection.

The output of the voltage feedback integrators 141 is then passed through another signal conditioning operational amplifier stage that incorporates a small low pass filter 133 and a phase lead network 134. This stage provides the required inverter voltage loop compensation. The outputs of this stage are the compensated and conditioned three phase voltage feedback signals 135 which are fed to the DSP A-D converters.

After conversion, the voltage feedback terms are summed 112 with the voltage setpoint commands 111, resulting in voltage error signals. The voltage error signals multiplied by the voltage proportional and integral terms ($Kv_P$ & $Kv_I$) 113. The resulting output is compared to the current limit term 114, clamped if required and then sent to the current loop.

Current feedback is taken from the inverter output phase current sensors, scaled and filtered with operational amplifiers 120, and the resulting current feedback signals 125, are fed to the DSP A-D converters. The output of the current limits 114 are summed with the current feedback values 115, resulting in current error terms. The current error terms are multiplied by the current proportional and integral terms ($Ki_P$ & $Ki_I$) 116 and then sent to the PWM generator 117, for comparison to a triangle wave carrier reference, resulting in an output PWM signal. The output PWM signal is transmitted to the output inverter power switches Q1–Q6, via gate driver circuits 45.

There are numerous variables (such as PWM filter circuit Q, DC link voltage, desired output impedance and PWM carrier frequency) that will impact feedback compensation, and gain selections. However, in one embodiment there are certain guidelines that provide a general method of approximation for selecting critical components and gain terms for a variety of PWM inverter applications.

AC PWM filter inductor selection criteria L6–L8: Inductor is between 4–8% impedance (at $I_{rated\ 60\ Hz}$). This provides a reasonable compromise between ripple current, large signal slew rate and minimum required control loop bandwidth.

$$V_{L-N}(0.05) < (I_{rated\ 60\ Hz})(j\omega L) < V_{L-N}(0.10)\ [L=400\ \mu H]$$

Capacitor selection criteria C5–C7: Capacitor value is selected to meet the required output ripple current ratings, as well as to limit the $V_{ripple\ sw\ freq\ MAX}$ to the desired maximum at the inverter point of common coupling (depends on the system rating, EMI criteria etc.).

$$V_{ripple\ sw\ freq\ MAX} = (I_{ripple\ sw\ freq\ MAX})(1/j\omega C)\ [C=230\ \mu F]$$

Voltage loop bandwidth: Voltage loop bandwidth may be selected such that the PWM LCR filter circuit resonant pole is well within the voltage loop crossover frequency.

$$V_{Loop\ BW} > (\sim 2)(1/2\pi\sqrt{LC})\ [525\ Hz\ LC\ pole = 1000\ Hz\ V_{Loop\ BW\ min}]$$

$$[Kv_P = R_2/R_1 = 16.0]$$

$$[Kv_I = 1/R_1 * C_f * s(f)]$$

Current loop bandwidth: Current loop bandwidth is selected such that the voltage loop crossover frequency is well within the current loop crossover frequency.

$$I_{Loop\ BW} > (\sim 2)(V_{Loop\ BW})\ [1000\ Hz\ V_{Loop\ BW} = 2000\ Hz\ I_{Loop\ BW\ min}]$$

$$[Ki_P = R_2/R_1 = 25]$$

$$[Ki_I = 1/R_1 * C_f * s(f)]$$

Switching frequency selection: The PWM carrier or switching frequency should be much greater than the current loop bandwidth for stable operation.

$$F_{carrier} > (\sim 10)(V_{Loop\ BW})\ [1000\ Hz\ I_{Loop\ BW} = 10000\ Hz\ F_{carrier\ min}]$$

In the case of utility grid connected current source applications, or applications which require the PWM inverter to switch between voltage source and current source modes of operation, the PWM filter and gain compensation selection criteria are impacted by numerous variables outside the scope of these simple guidelines. Specifically, the PWM filter and compensation values depend greatly on the anticipated range of utility grid connection impedance, as well as the required magnitude of harmonic rejection capability.

As shown in FIG. 3, the dual boost equipped 3 phase power inverter topology and control method is ideal for applications, which require battery driven startup of rotating machinery such as microturbine generators. Typically, microturbine generator systems consist of a gas turbine connected to a high speed permanent magnet 480 to 575V, 3 phase alternator. Typical lead acid batteries are connected to the dual boost input that drives the output DC bus voltage up to nominal levels (~900VDC). The main power inverter then uses this elevated DC voltage to "six step" drive the alternator up to the microturbine self sustaining RPM for turbine starting. Once started, the alternator now becomes the source (the batteries are disconnected). The alternator output is rectified and fed to the balanced dual boost regulator, which provides voltage regulation and balancing etc. continuously, for the main three phase, 3 or 4 wire, output power inverter. Thus creating a low output impedance three phase, four wire voltage source ideally suited for non-linear loads. AC output voltages with DC offsets of <10–20 m VDC are possible.

FIGS. 4 and 5 illustrate that the power inverter topology and control method described herein, is also ideal for fuel cell power source applications of all types, and is easily adapted to single phase applications by removal of the unnecessary $3^{rd}$ phase ½ bridge. Where DC power is conditioned by a high frequency center tapped transformer, the neutral point of the DC link voltage is maintained well within levels which can be corrected for by the output power inverter topology and control method. Thus output AC voltages with DC offsets of <10–20 m VDC are possible. This is particularly useful if the inverter is loaded with high harmonic content non-linear type loads. Further, the battery augmented fuel cell based power inverter can use the a dual boost, or high frequency center tapped transformer to provide power for overload/transient load purposes, to maintain a more constant, stable output from the fuel cell itself. This is in addition to allowing the main output inverter maximum output power capability to be extended beyond the maximum fuel cell power output capability.

Referring to FIGS. 6A, 6B and 6C, the inverter topology showing the interconnection of all 3 phases is provided. The three input signals $VA_{13}$in, $VB_{13}$in and $VC_{13}$in form the LV-N feedback section 130. The flow through each of the phases is similar, and discussed in detail herein.

The foregoing description of the preferred embodiment of the invention has been presented for the purpose of illustration and description. It is not intended to be exhaustive or to limit the invention to the precise form disclosed. Many modifications and variations are possible in light of the above teachings. It is intended that the scope of the invention be limited not by this detailed description, but rather by the claims appended hereto.

The invention is susceptible of many variations, all within the scope of the specification, figures, and claims. The preferred embodiment described here and illustrated in the figures should not be construed as in any way limiting.

No warranty is expressed or implied as to the actual degree of safety, security or support of any particular specimen of the invention in whole or in part, due to differences in actual production designs, materials and use of the products of the invention.

What is claimed is:

1. A transformerless power inverter system for generating a balanced, regulated three phase AC output comprising:
   a DC source;
   a DC-DC converter for regulating said DC source, wherein said DC-DC converter comprises a pair of independent paths having a common neutral;

a control section with a voltage loop and a current loop for each phase of said three phase AC output, wherein a controller processes a plurality of pulse width modulated switching signals; and an inverter section coupled to said DC-DC converter and to said control section, wherein said inverter section uses said switching signals to generate said three phase AC output.

2. The transformerless power inverter system according to claim 1, further comprising a rectifier section coupled to a three-phase four wire AC source for generating said DC source, wherein said AC source uses said common neutral.

3. The transformerless power inverter system according to claim 1, wherein said controller is a digital signal processor.

4. The transformerless power inverter system according to claim 1, further comprising a three-phase filter coupled to said inverter section for filtering said three phase AC output.

5. The transformerless power inverter system according to claim 1, wherein said DC-DC converter is a dual boost regulator.

6. The transformerless power inverter system according to claim 1, wherein said inverter section is comprised of two or more inverter power switches for each phase of said three phase output wherein said inverter power switches are switched by said pulse width modulated switching signals.

7. The transformerless power inverter system according to claim 1, wherein said DC-DC converter further comprises a pair of DC link capacitors in said independent paths.

8. A transformerless power inverter system for generating a balance regulated AC output, comprising:

a DC power source;

a DC-DC converter having a high frequency (HF) transformer with a center tap coupled to a common neutral, wherein said HF transformer is coupled to said DC source, and wherein said DC-DC converter includes a pair of independent charging paths coupled to said common neutral;

an inverter section coupled to said DC-DC converter for generating said regulated AC output from said DC source; and a control section coupled to said inverter section, wherein said control section comprises a phase output controller for each phase of said AC source each said phase output controller having a voltage loop and a current loop, and wherein a processor generates a pulse width modulated signal to said inverter section.

9. The transformerless power inverter system according to claim 8, further comprises a pair of DC link capacitors in said independent charging paths.

10. The transformerless power inverter system according to claim 8, further comprises a rectifier section coupled between said DC-DC converter and said inverter section.

11. The transformerless power inverter system according to claim 8, wherein said regulated AC output is three phase.

12. The transformerless power inverter system according to claim 8, further comprising a filter coupled to said inverter section for filtering said AC output.

13. The transformerless power inverter system according to claim 8, wherein said inverter section is comprised of two or more inverter power switches for each phase of said three phase output wherein said inverter power switches are switched by said pulse width modulated signals.

14. A method for generating a regulated three phase AC output from an inverter, comprising the steps of:

providing a DC source as an input to said inverter;

calculating a voltage feedback for each phase of said regulated output with reference to a common neutral;

calculating a current feedback for each phase of said regulated output;

comparing a voltage command to said voltage feedback to produce a voltage error;

multiplying said voltage error by a voltage proportional and integral tern to produce a proportioned voltage signal;

comparing said proportioned voltage signal to said current feedback and calculating a current error;

multiplying a current error by a current proportional and integral term to produce a proportioned current signal; and calculating a pulse width modulated signal for said inverter.

15. The method for generating a regulated three phase AC output according 14, further comprising a step of rectifying an AC source to generate said DC source.

16. The method for generating a regulated three phase AC output according to claim 14, wherein said step of calculating a current feedback further comprises the steps of measuring a phase current for each said phase to produce a measured phase current, scaling said measured phase current, and filtering said measured phase current.

17. The method for generating a regulated three phase AC output according to claim 14, wherein said step of calculating a current error further comprises comparing and clamping said proportioned voltage signal to a current limit term.

18. The method for generating a regulated three phase AC output according to claim 14, wherein said step of calculating a pulse width modulated signal comprises comparing said proportioned current signal to an internally generated triangle reference.

19. The method for generating a regulated three phase AC output according to claim 14, wherein said step of calculating a voltage feedback further comprises producing a voltage difference signal for each said phase between an output voltage of each said phase and said common neutral, and scaling and filtering said voltage difference signal.

20. The method for generating a regulated three phase AC output according to claim 19, further comprising low pass filtering said voltage difference signal.

21. The method for generating a regulated three phase AC output according to claim 19, further comprising providing voltage loop compensation to said voltage difference signal.

* * * * *

UNITED STATES PATENT AND TRADEMARK OFFICE
CERTIFICATE OF CORRECTION

PATENT NO. : 6,404,655 B1 Page 1 of 1
DATED : June 11, 2002
INVENTOR(S) : Richard Shaun Welches It is certified that error appears in the above-identified patent and that said Letters Patent is hereby corrected as shown below:

Column 2,
Line 9, delete "modem", insert -- modern --

Column 3,
Line 36, delete "modem", insert -- modern --

Column 10,
Line 41, delete "VA13in, VB13in and VC13in", insert -- VA_in, VB_in and VC_in --

Column 12,
Line 17, delete "tern", insert -- term --

Signed and Sealed this

Twenty-ninth Day of July, 2003

JAMES E. ROGAN
*Director of the United States Patent and Trademark Office*